US012561880B2

(12) United States Patent
Boyles

(10) Patent No.: US 12,561,880 B2
(45) Date of Patent: Feb. 24, 2026

(54) AUGMENTED REALITY TATTOO

(71) Applicant: Universal City Studios LLC, Universal City, CA (US)

(72) Inventor: Jeffrey Boyles, Winter Park, FL (US)

(73) Assignee: Universal City Studios LLC, Orlando, FL (US)

( * ) Notice: Subject to any disclaimer, the term of this patent is extended or adjusted under 35 U.S.C. 154(b) by 184 days.

(21) Appl. No.: 18/143,708

(22) Filed: May 5, 2023

(65) Prior Publication Data

US 2023/0360302 A1     Nov. 9, 2023

Related U.S. Application Data

(60) Provisional application No. 63/338,779, filed on May 5, 2022.

(51) Int. Cl.
| | |
|---|---|
| *G06T 13/80* | (2011.01) |
| *G06K 7/14* | (2006.01) |
| *G06T 7/73* | (2017.01) |
| *G06T 11/00* | (2006.01) |
| *G06T 13/40* | (2011.01) |

(52) U.S. Cl.
CPC ............ *G06T 13/80* (2013.01); *G06K 7/1417* (2013.01); *G06T 7/74* (2017.01); *G06T 11/00* (2013.01); *G06T 13/40* (2013.01); *G06T 2207/30196* (2013.01)

(58) Field of Classification Search
CPC . G06T 11/001; G06T 3/18; G06T 5/50; G06T 5/77; G06T 7/0002; G06T 7/11
See application file for complete search history.

(56) References Cited

U.S. PATENT DOCUMENTS

| | | | | |
|---|---|---|---|---|
| 8,083,422 | B1* | 12/2011 | Simmons | G01B 21/00 |
| | | | | 358/1.18 |
| 8,643,725 | B1* | 2/2014 | Biagiotti | G09G 3/006 |
| | | | | 348/184 |
| 10,482,675 | B1* | 11/2019 | Sutter | G06T 19/006 |
| 2006/0242062 | A1* | 10/2006 | Peterson | G06Q 20/04 |
| | | | | 705/45 |
| 2014/0176608 | A1 | 6/2014 | Boysen et al. | |

(Continued)

FOREIGN PATENT DOCUMENTS

| | | |
|---|---|---|
| WO | 2021061084 A1 | 4/2021 |

OTHER PUBLICATIONS

PCT/US2023/021170 International Search Report and Written Opinion mailed Jun. 28, 2023.

*Primary Examiner* — Xiao M Wu
*Assistant Examiner* — Ahmed Taha
(74) *Attorney, Agent, or Firm* — Fletcher Yoder, PC

(57) ABSTRACT

A system includes one or more processors and memory storing instructions that, when executed by the one or more processors, are configured to cause the one or more processors to receive an image of a temporary tattoo incorporating machine-readable imagery and read the machine-readable imagery from the image of the temporary tattoo. The instructions, when executed, are further configured to cause the one or more processors to instruct an augmented reality application to augment the image of the temporary tattoo into an animated version of the temporary tattoo based on data associated with the machine-readable imagery and instruct display of the animated version of the temporary tattoo.

20 Claims, 3 Drawing Sheets

(56)                    References Cited

U.S. PATENT DOCUMENTS

2014/0274115 A1*   9/2014  Michalson ............ H04W 4/029
                                                                     455/456.1
2015/0358614 A1    12/2015  Jin
2018/0330167 A1*   11/2018  Siggard ................... G06T 13/80

* cited by examiner

AUGMENTED REALITY TATTOO

CROSS-REFERENCE TO RELATED APPLICATIONS

This application claims priority to and the benefit of U.S. Provisional Application No. 63/338,779, entitled "AUGMENTED REALITY TATTOO," filed May 5, 2022, which is hereby incorporated by reference in its entirety for all purposes.

BACKGROUND

Since the early twentieth century, amusement parks have substantially grown in popularity, and an increasing amount of people visit amusement park attractions. Further, an increasing number of amusement parks attractions have utilized virtual reality (VR) components and augmented reality (AR) components to provide various experiences to guests within the amusement park. Such components may generate visual, audio, and/or haptic feedback to provide a virtual or augmented reality experience to guests within the park. It is now recognized that it is desirable to utilize aspects of the VR and AR components to provide additional services and features to amusement park attractions, thereby improving a guest experience within the amusement park.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a system includes one or more processors and memory storing instructions that, when executed by the one or more processors, are configured to cause the one or more processors to receive an image of a temporary tattoo incorporating machine-readable imagery, and read the machine-readable imagery from the image of the temporary tattoo. The instructions, when executed, are further configured to cause the one or more processors to instruct an augmented reality application to augment the image of the temporary tattoo into an animated version of the temporary tattoo based on data associated with the machine-readable imagery and instruct display of the animated version of the temporary tattoo.

In another embodiment, a method for providing an augmented reality temporary tattoo may include generating, via one or more processors, a temporary tattoo design having one or more quick response (QR) codes embedded within the temporary tattoo design and applying, via a printer, the temporary tattoo design to a guest within an amusement park as a temporary tattoo, wherein the temporary tattoo includes the one or more QR codes. The method may further include extracting, using the one or more processors, the one or more QR codes from an image of the temporary tattoo captured via an image sensor of a computing device, instructing, via the one or more processors, an augmented reality application to augment the image of the temporary tattoo into an animated version of the temporary tattoo based on extracting the one or more QR codes from the image of the temporary tattoo, and displaying, via a display associated with the computing device, the animated version of the temporary tattoo.

In another embodiment, a non-transitory, computer-readable medium includes computer-executable instructions that, when executed by one or more processors, cause the one or more processors to receive an image of a temporary tattoo incorporating machine-readable imagery, read the machine-readable imagery from the image of the temporary tattoo, instruct an augmented reality application to augment the image of the temporary tattoo into an animated version of the temporary tattoo based on data associated with the machine-readable imagery, and instruct display of the animated version of the temporary tattoo.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and context of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
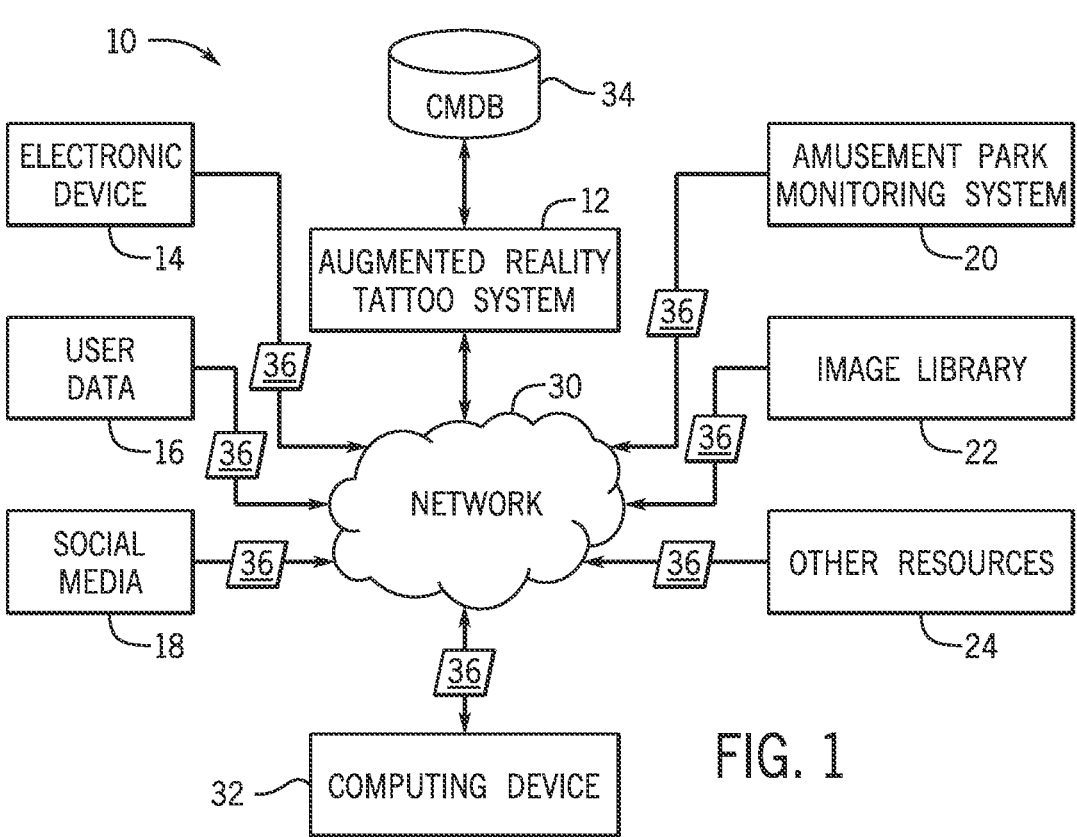
FIG. 1 illustrates a block diagram of an augmented reality tattoo system for providing augmented reality experiences to guests within an amusement park based on received data, in accordance with embodiments described herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to the field of amusement parks and utilization of machine-readable codes to facilitate interactions with virtual reality, augmented reality, and guest-specific operations. More specifically, embodiments of the present disclosure are related to techniques for embedding one or more quick response (QR) codes or other machine-readable imagery into a temporary tattoo design and/or temporary tattoo to provide an experience for a guest associated with the temporary tattoo design and/or temporary tattoo. The QR codes may provide access to or may be associated with augmented reality (AR) applications and/or other digital media applications that may generate interactive views of the guest's temporary tattoo and/or provide additional content for guests within the amusement park. The QR codes or AR Applications may be linked to one or more user profiles. Thus, user profiles may define responses (e.g., animation generation or other actions) to reading the QR codes and/or reading the QR codes may cause adjustments (e.g., increasing a user level in a game) to the profiles. Further, it should be noted that QR codes are examples of graphic machine-readable codes, such as barcodes. To facilitate discussion, the present disclosure focuses on utilization of QR codes, but one of ordinary skill in the art will understand that this is an example and can be replaced by other machine-readable graphics (or other detectable imagery that can be linked to an identifier) in accordance with other embodiments. For example, in accordance with an embodiment, a QR code as discussed below may be replaced with a barcode or the like. In addition, the computing device may include a library of reference images (e.g., temporary tattoo designs) or reference data points for each temporary tattoo that are used to identify the scanned temporary tattoo and associate the temporary tattoo with the appropriate AR Applications and user profiles, which may supplement or replace a QR code in the disclosure below.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

Computer program instructions, in accordance with present embodiments, may be stored in a computer readable medium (e.g., hard drive, memory, disk) that can direct a computer, other programmable data processing apparatus, or other devices to function in a particular manner, such that the instructions stored in the computer readable medium intimate or cause a specified function/act. The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

In accordance with present embodiments, quick response (QR) codes may be integrated with temporary tattoo designs and/or temporary tattoos and employed to provide services and/or experiences to guests within the amusement park. QR codes may be embedded into temporary tattoo designs and/or temporary tattoos which may be applied to guests (or an object associated with the guest) within the park, and the temporary tattoos (e.g., physical temporary tattoos) may be scanned and viewed through virtual reality (VR) components, augmented reality (AR) components, and other digital media displays (e.g., VR/AR headsets, VR/AR glasses, displays, mobile devices), to provide additional features, services, and/or experiences for guests within the amusement park. For example, guests within the park may scan a QR code integrated with a tattoo (e.g., a tattoo of a particular attraction) to initiate a virtually augmented view of the tattoo (e.g., an animation of a depicted ride operating) in addition to provision of information (e.g., a wait time, type, speed, physical characteristic requirement information or the like for a depicted attraction), such that a guest may be informed of pertinent information related to anything depicted by the tattoo.

Present embodiments are directed to a system that embeds one or more QR codes into a temporary tattoo design and/or temporary tattoo associated with a guest to provide an amusement park experience for the guest. That is, QR codes may be generated and embedded into a picture or a pattern (e.g., temporary tattoo design), and the picture or pattern may be disposed (e.g., painted, printed, worn) on a guest or an object associated with the guest and utilized to access content provided by the amusement park. In some embodiments, the QR codes embedded into the pattern or picture may include a payload of data that may be extracted and processed by a computing system to provide an experience for the guest. For example, guests may be tattooed with a picture or pattern having one or more embedded QR codes within the picture or pattern, and guests may utilize a computing device (e.g., smart phone, AR headset, AR glasses) to actively capture an image of the picture or pattern, thereby directing the guest to an augmented reality (AR) application or other digital media application that may augment or animate the tattoo and/or the environment associated with the tattoo. In some embodiments, the applications accessed by the QR codes may provide additional content associated with the tattoo and/or with an aspect of the amusement park. As disclosed herein, there term "tattooed" may refer to the process of a guest applying a temporary tattoo design and/or temporary tattoo to an aspect of the body (e.g., arm, forearm, hand, leg) or an object associated with the guest (e.g., wallet, purse, keychain). Similarly, the term "temporary tattoo" may refer to a temporary tattoo design that may be physically disposed (e.g., printed onto transfer paper and applied, painted) on a guest and/or on an object associated with the guest. Further, in certain embodiments, the temporary tattoos discussed herein may be associated with a wearable garment or sleeve that a guest may place over a body part of the guest. For example, the temporary tattoo may be a garment or sleeve configured to be disposed over a guest's arm or other body part, and the garment or sleeve may include the temporary tattoo design having the one or more QR codes or other machine-readable imagery that may be scanned to access an animated version of the tattoo, as discussed in greater detail below. The temporary tattoo may be printed on, 3D printed into, woven into, or otherwise integrated with the garment. Additionally, while the temporary tattoo designs and/or temporary tattoos disclosed herein are associated with one or more or more QR codes, it should be noted that the QR codes embedded into the tattoos may be unperceivable to the human eye. That is, the temporary tattoo designs and/or temporary tattoos may generally appear as generic objects (e.g., animals, flowers, buildings, symbols) that may be associated with a theme of the amusement park and/or chosen from a list of tattoo options provided by the amusement park, and the QR codes embedded therein may be essentially undetectable (e.g., via camouflage, integration with other imagery, use of infrared-reflective material) until scanned by an appropriate computing device, as discussed in greater detail below.

By way of introduction, FIG. 1 illustrates a block diagram of a system 10 in which an augmented reality tattoo system (ARTS) 12 may receive data that may be used to initiate one or more experiences for a guest of an amusement park. Referring now to FIG. 1, the ARTS 12 may receive data from various sources. The received data may be related to image data of a temporary tattoo applied to or worn by a guest (or an object associated with the guest), and the temporary tattoo may be associated with a particular attraction of the amusement park. In certain embodiments, the received data may be related to aspects of the amusement park (e.g., wait times associated with particular attractions, locations of individuals (e.g., characters) within the park, and the like). Using the collected data, the ARTS 12 may provide a virtually augmented view of the tattoo and/or additional information associated with the particular attraction (e.g., wait time, type, speed, physical characteristic requirement, and the like). That is, the ARTS 12 may analyze a QR code or other machine-readable imagery embedded into the tattoo or an entirety of the tattoo, thereby enabling the ARTS 12 to provide an augmented view of the tattoo (e.g., animated view of the tattoo) and/or additional information associated the amusement park (e.g., information associated with a particular attraction of the amusement park, information associated with a character of the amusement park, etc.) via a user device associated with the guest.

In certain embodiments, the ARTS 12 may be any suitable computing or server device. Using data sources (e.g., databases, online sources, electronic devices) accessible to the ARTS 12, the ARTS 12 may receive data associated with a tattoo having a QR code embedded therein. For example, the ARTS 12 may receive data from sources such as an electronic device 14 (e.g., a mobile phone, a smart watch, a laptop, a camera) associated with a guest of the amusement park, user data 16 associated with a guest of the amusement park, social media 18, an amusement park monitoring system 20, an image library 22, and other resources 24. For example, LIDAR from a smart phone may be employed to detect contours of a tattoo location while a camera of the smart phone may capture a QR code or other machine-readable imagery embedded in the tattoo, thereby enabling related data to be transmitted to the ARTS 12 for use in generating desired augmented reality graphics. The data from the various data sources noted above may be received in real time or near-real time, thereby enabling the ARTS 12 to perform the embodiments described herein in a timely manner to cover any related activities that are performed soon after.

The electronic device 14 may be any suitable computing device capable of capturing an image of a guest within the amusement park and/or an image of a temporary tattoo associated with the guest. For example, the electronic device 14 may be a cellular phone, a wearable device (e.g., a smart watch), a camera, a laptop, a drone, a sensor, and the like, and may be associated with a guest of the amusement park. In certain embodiments, the electronic device 14 may send digital image data of a temporary tattoo associated with a guest to the ARTS 12. In certain embodiments, upon capturing video and/or image data of a temporary tattoo and/or temporary tattoo design via the electronic device 14, the image data may be automatically retrieved by the ARTS 12 and analyzed to provide the guest with an augmented reality version of the tattoo (e.g., animated tattoo) and/or to provide the guest with additional information associated with a particular attraction of the amusement park, as described in greater detail below. Additionally, in certain embodiments, the electronic device 14 may correspond to one or more cameras associated with the amusement park. For example, the amusement park may have cameras disposed proximate an entry point of the amusement park, and the one or more cameras may be configured to capture image data of guests entering the park, thereby enabling the ARTS 12 to determine a suitable location to position a temporary tattoo.

The electronic device 14 may also include cameras, sensors, or other technology configured to capture and/or recognize guest motions or gestures (e.g., hand tracking, head tracking, eye tracking) within the amusement park. That is, a guest may move or make gestures while participating in an attraction or while traversing the amusement park and data captured via the electronic devices 14 related to the recognized gesture may be utilized by the ARTS 12 to generate a responsive animation of the temporary tattoo. For example, the electronic device 14 may capture image data of a temporary tattoo depicting an object (e.g., ball or other projectile) on a guest's hand. The electronic device 14 may also capture data related to the guest making a throwing motion. In response, the ARTS 12 may generate an augmented reality version (e.g., animated version) of the depicted object being thrown in a virtual space that corresponds to the physical space associated with the guest. Further, the ARTS 12 may receive data related to other physical or virtual objects presented or displayed in the physical environment, including props, characters, or media images, and the ARTS 12 may use the captured data associated with the direction and/or orientation of the guest's movement or gesture to identify a virtual trajectory and/or an object that may be virtually struck by the thrown object. The ARTS 12 may then record the action or achievement to a guest's user profile associated with the temporary tattoo, and later display a score or captured reward when the guest uses a computing device to capture an image of the temporary tattoo. The temporary tattoo thereby enables guests to interact with the perceived environment without the use of actual objects (e.g., physical projectiles, balls) in the physical environment where other guests are also interactively participating.

The user data 16 may include information regarding the user's purchases, interests, previous visits to the amusement park, and the like. The user data 16 may include sales and purchases from an e-wallet, credit card purchases, and/or payment information that may be indicative of a guest's interests. In certain embodiments, the sales and purchase information may correspond to purchases made by a guest during a previous visit to the amusement park. For example, the sales and purchase information may indicate that during a previous visit to the amusement park, the guest purchased an item associated with a particular character. Using this information, the ARTS 12 may determine that the user has an increased interest in the particular character, thereby enabling the ARTS 12 to provide the guest with additional experiences associated with that character. In certain embodiments, the user data 16 may be stored in a user profile, thereby enabling the ARTS 12 to communicate with the user profile to provide the guest with data and/or information related to the guest's interests. Further, information stored within the user profile may be retrieved by the ARTS 12 to provide the guest with certain experiences. For example, during an initial visit to the amusement park, a guest may purchase a temporary tattoo design and/or temporary tattoo. As the guest visits various attractions within the park and/or completes certain activities, the guest may be tracked and may become eligible for certain upgrades to the temporary tattoo design and/or temporary tattoo, or upgraded experiences. Alternatively, the guest may purchase upgrades for the temporary tattoo design and/or temporary tattoo and the upgrades may be saved in the user profile such that during a subsequent visit to the amusement park, the temporary tattoo design and/or temporary tattoo associated with the guest may include the upgrades (e.g., additional designs that correspond to additional privileges). For example, an upgraded tattoo may include imagery (e.g., a QR code) that is linked to an exclusive ride pass. Additionally, in certain embodiments, the upgrades to the temporary tattoo design and/or temporary tattoo associated with completed activities may be displayed upon scanning an image of the temporary tattoo. For example, in certain embodiments, the guest may choose a particular temporary tattoo design to be disposed on the guest or an object associated with the guest. The temporary tattoo design may correspond to an image of a lion. At a first time during a guest's visit to the amusement park, scanning the temporary tattoo and/or an image of temporary tattoo design may cause a display of the lion roaring (e.g., the augmented reality application may output instructions to a display (e.g., display of an electronic device 14, display of computing device 32) to display the lion roaring, a processor (e.g., of the ARTS 12) may instruct the augmented reality application to instruct a display (e.g., display of electronic device 14, display of computing device 32) to display an image, images, and/or animation generated by the augmented reality application (e.g., the lion roaring), a processor (e.g., of the ARTS 12) may instruct a display (e.g., display of electronic device 14, display of computing device 32) to display the output of the augmented reality application (e.g., the lion roaring)). At a second time subsequent to the first time during the guest's visit and after the guest has completed one or more activities within the amusement park, the guest may be prompted to view the temporary tattoo. Based on the guest's completed activities, scanning the temporary tattoo and/or an image of the temporary tattoo design may cause a display of the lion with one or more upgrades relative to the image of the temporary tattoo scanned at the first time. For example, scanning the temporary tattoo and/or an image of the temporary tattoo at a second time subsequent to the first time and after the guest has completed one or more activities within the amusement park, may cause a display of the lion roaring with a crown on the lion's head (e.g., the augmented reality application may output instructions to a display (e.g., display of an electronic device 14, display of computing device 32) to display an image, images, and/or animation generated by the augmented reality application (e.g., the lion with a crown and roaring), a processor (e.g., of the ARTS 12) may instruct the augmented reality application to instruct a display (e.g., display of electronic device 14, display of computing device 32) to display the lion with a crown and roaring, a processor (e.g., of the ARTS 12) may instruct a display (e.g., display of electronic device 14, display of computing device 32) to display the output of the augmented reality application (e.g., the lion roaring with a crown on the lion's head)).

The social media 18 may include data from individuals' accounts on available social media sites. In certain embodiments, the social media 18 may include information associated with a guest and may be received from one of the electronic devices 14 described above. For example, the social media 18 may be associated with a guest's personal account, and may include information regarding the guest's property, interests, and the like. The social media 18 may also include data trending on social media sites that may not be directly associated with the guest.

The amusement park monitoring system 20 may provide contextual or additional information related to aspects of the amusement park. For example, the information may include a total number of guests visiting the amusement park, wait times associated with particular attractions of the amusement park, the speed at which a queue associated with a particular attraction is moving, attractions that are inoperative and/or are undergoing maintenance, and the like. Further, the amusement park monitoring system may utilize Bluetooth low energy beacons, global positioning satellites, or similar sensors and technology to ascertain a location of a guest within the amusement park or a location of a particular character within the amusement park. This data may be used by the ARTS 12 to provide the guest with additional information associated with a particular attraction and/or character that the guest may be interested in, as discussed in greater detail below.

The image library 22 may include various reference images of the temporary tattoo designs and/or temporary tattoos available for selection by a guest of the amusement park. For example, upon scanning an image of a temporary tattoo (e.g., physical temporary tattoo, physically printed temporary tattoo) associated with a guest, the ARTS 12 may reference the image library 22 to identify a corresponding temporary tattoo design. That is, the temporary tattoo may include data points and the data points of the temporary tattoo may be compared with data points from a reference image (e.g., temporary tattoo design) stored in the image library 22 to identify a match between the temporary tattoo and a reference image in the image library 22. In this way, the ARTS 12 may utilize reference images stored in the image library 22 to filter out distortion, such as may be created by application of the temporary tattoo to contoured surfaces (e.g., surfaces of the body or objects), thereby facilitating improved detection of QR codes (or the like) embedded within the temporary tattoo. In certain embodiments, a scan of the surface of the body or object may be obtained and used to adjust contour distortions to facilitate improved detection of image characteristics (e.g., embedded QR codes or other machine-readable imagery). The other resources 24 may include any other electronic information that may be available via a network, the Internet, or the like. In certain embodiments, the data from each of the data sources described above may collectively be referred to as data 36, which may be utilized by the ARTS 12 to perform and/or enable the embodiments described herein.

In certain embodiments, the data sources may communicate with one another and with the ARTS 12 over a network 30. The network 30 may be any suitable wired or wireless (e.g., radio or light based) network that may facilitate communication of data between devices. In some embodiments, the network 30 may be a Wi-Fi network, a light detection and ranging (LIDAR) network, a 4G network, a 4G LTE network, a 5G network, a Bluetooth network, an ultra-wideband, a Near Field Communication (NFC) network, or any suitable network for communicating information between devices. Communication via the network 30 may allow the devices and data sources connected to the network 30 to collect and communicate the data 36 pertaining to a temporary tattoo having an embedded QR code therein, thereby enabling the ARTS 12 to provide a guest with a virtual reality experience and/or to provide the guest with additional information associated with the amusement park. In certain embodiments, the ARTS 12 may store the data 36 from the various data sources described above in a configuration management database 34.

With the foregoing in mind, the ARTS 12 may receive the data 36 from the various sources described above to provide a guest with an augmented reality experience and/or to provide the guest with additional information associated with the amusement park. In certain embodiments, in addition to providing the guest with an augmented reality tattoo (e.g., a view through an AR device of animations based on the tattoo), the ARTS 12 may send a notification or alert to a computing device 32 associated with a guest to notify the guest of additional information associated with the amusement park. In certain embodiments, the additional information may be provided within the augmented reality graphics associated with the tattoo. For example, the guest may receive a notification instructing the guest to scan their temporary tattoo for an update related to the guest's queue status. Upon scanning the temporary tattoo, a display showing a representation (e.g., AR image, VR image, other suitable image) of the temporary tattoo may show the image of the temporary tattoo virtually morphing into an indication that provides the additional information associated with the amusement park (e.g., image of the tattoo includes a number corresponding to a guest's position within a virtual queue). It should be noted that the computing device 32 may be similar to the electronic devices 14, and in some embodiments, the computing device 32 may be one of the electronic devices 14 used by the ARTS 12 as a data source. The ARTS 12 and the computing device 32 may include any suitable computing device such as a general-purpose computer, a mobile computing device, a laptop-computing device, a tablet computing device, a wearable computing device, and the like. Additional details with regard to the ARTS 12 will be discussed below with reference to FIG. 2.

After receiving the notification, the computing device 32 may provide an indication that the notification was received and automatically display and/or instruct a display (e.g., display separate from the computing device) to display the notification having the additional information associated with the amusement park. In some embodiments, the indication may be activated despite the computing device 32 being in a sleep or low power mode to increase the likelihood that the user will take note of the notification. In some embodiments, the operations performed by the ARTS 12 may be triggered or initiated based on conditions detected by or based on input data received by one or more of the devices described above. In this way, the ARTS 12 may preserve its processing power to provide augmented reality experiences and/or additional information associated with the amusement park to guests in response to receiving a captured image of a temporary tattoo. That is, the operations of the ARTS 12 may automatically initiate in response to certain image data being received. As noted above, in certain embodiments, the notification may include an indication instructing the guest to observe their tattoo using the computing device 32 to access an augmented reality image of their tattoo, which may provide additional information associated with the amusement park (e.g., wait times, position within a virtual queue, etc.) in addition to augmented reality graphics.

Figure 2:
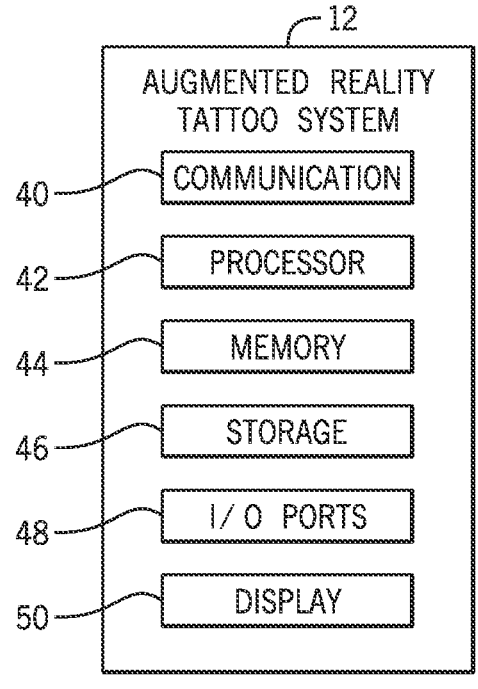
FIG. 2 illustrates a block diagram of a computing device that may be part of the augmented reality tattoo system of FIG. 1, in accordance with embodiments described herein.

To perform some of the actions set forth above, the ARTS 12 may include certain components to facilitate these actions. FIG. 2 is a block diagram of example components within the ARTS 12. For example, the ARTS 12 may include a communication component 40, a processor 42, a memory 44, a storage 46, input/output (I/O) ports 48, a display 50, and the like. The communication component 40 may be a wireless or wired communication component that may facilitate communication between the ARTS 12, the electronic devices 14, the amusement park monitoring system 20, the computing device 32, and the like. Additionally, the communication component 40 may facilitate data transfer to the ARTS 12, such that the ARTS 12 may receive the user data 16, the social media 18, the other resources 22, and the like.

The processor 42 may be any type of computer processor or microprocessor capable of executing computer-executable code. The processor 42 may also include or represent multiple processors that may perform the operations described below.

The memory 44 and the storage 46 may be any suitable articles of manufacture that can serve as media to store processor-executable code, data, or the like. These articles of manufacture may represent computer-readable media (e.g., any suitable form of memory or storage) that may store the processor-executable code used by the processor 42 to perform the presently disclosed techniques. The memory 44 and the storage 46 may also be used to store the data 36 (e.g., the data described above), various other software applications for analyzing the data 36, and the like. The memory 44 and the storage 46 may represent non-transitory computer-readable media (e.g., any suitable form of memory or storage) that may store the processor-executable code used by the processor 42 to perform various techniques described herein. It should be noted that non-transitory merely indicates that the media is tangible and not a signal.

The I/O ports 48 may be interfaces that may couple to other peripheral components such as input devices (e.g., keyboard, mouse), sensors, input/output (I/O) modules, and the like. The display 50 may operate to depict visualizations associated with software or executable code being processed by the processor 42. For example, the display 50 may depict virtual imagery based on detection and observation of the temporary tattoo via the ARTS 12. In one embodiment, the display 50 may be a touch display capable of receiving inputs from a user of the ARTS 12. For example, the display 50 may allow for interaction (e.g., touchscreen input) with AR graphics presented on the display 50. The display 50 may be any suitable type of display, such as a liquid crystal display (LCD), plasma display, or an organic light emitting diode (OLED) display, for example. Additionally, in one embodiment, the display 50 may be provided in conjunction with a touch-sensitive mechanism (e.g., a touch screen) that may function as part of a control interface for the ARTS 12 or allow interaction with the augmented image.

It should be noted that the components described above with regard to the ARTS 12 are exemplary components and the ARTS 12 may include additional or fewer components as shown. Additionally, it should be noted that the electronic devices 14, the amusement park monitoring system 20, and the computing device 32 may also include similar components as described as part of the ARTS 12. In certain embodiments, the ARTS 12 may include each of the elements described above with respect to FIG. 1 or the ARTS 12 may be a separate component configured to receive the data 36 from the various data sources described above.

Figure 3:
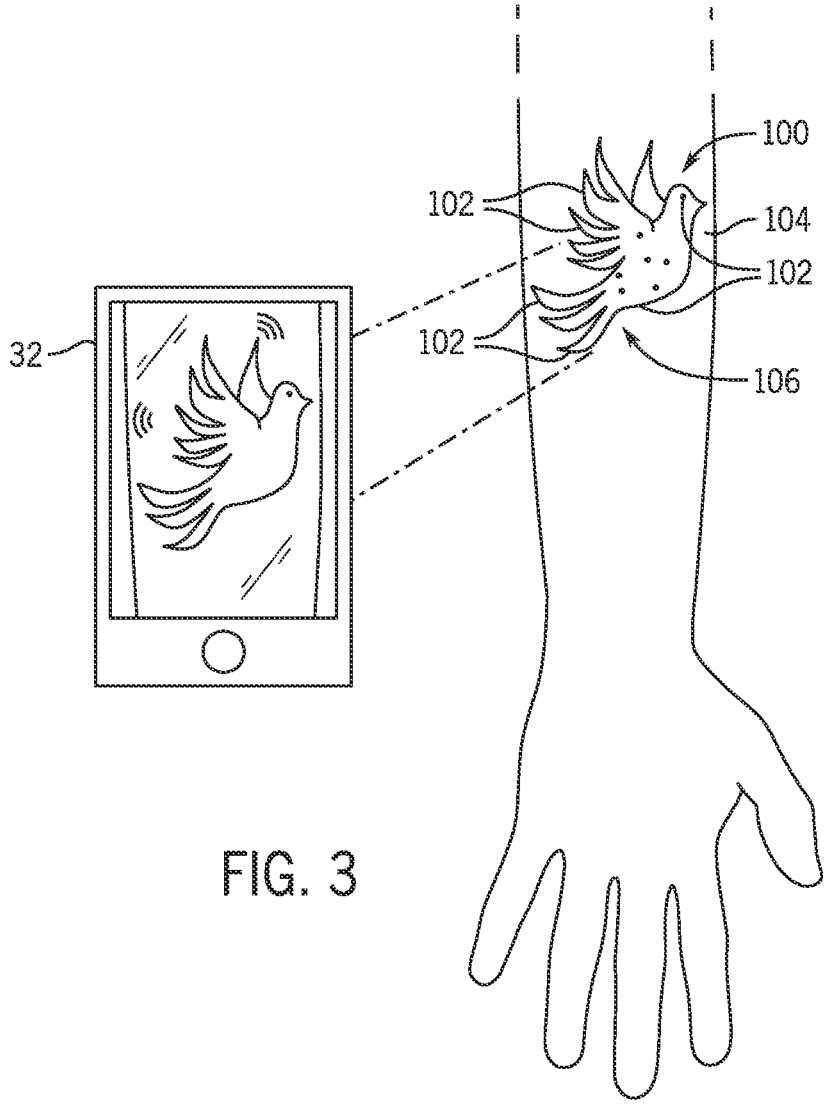
FIG. 3 illustrates a schematic view of an embodiment of an augmented reality (AR) tattoo associated with a guest of an amusement park, in accordance with embodiments described herein.

With this in mind, FIG. 3 illustrates an embodiment of a tattoo 100 (e.g., temporary tattoo) associated with a guest of an amusement park. As noted above, the temporary tattoo 100 may include one or more QR codes 102 (or other detectable imagery having an associated identifier) with encoded data that, when scanned by the electronic device 14 or the computing device 32, may provide access to various features, services, and experiences within the amusement park, as described in greater detail below. As disclosed herein, a "temporary tattoo" refers to a non-permanent tattoo that has been applied to a guest or an object associated with the guest that may be removed via washing, peeling, application of one or more chemicals, and/or may fade over time such that the tattoo is no longer present or visible after a threshold amount of time (e.g., 1 day, 1 week). In some embodiments, the temporary tattoos 100 may be made of visible inks, pigments, or dyes such that the tattoos are visible to guests within the park. In certain embodiments, the tattoos 100 may be made of invisible inks, pigments, or dyes such that the tattoos must be activated (e.g., exposed to specified wavelengths of light, viewed under a specialized type of light (e.g., black light, infrared light)) before becoming visible. Further, as noted above, the tattoos 100 disclosed herein may include multiple QR codes 102 disposed throughout the tattoo 100, thereby enabling an image capturing process with increased accuracy. That is, tattoos 100 disclosed herein may each include identical QR codes 102 scattered throughout the tattoo 100 and in some cases overlapping such that computing devices (e.g., electronic device 14, computing device 32) configured to extract the QR codes 102 may have an increased amount of opportunities to capture a complete QR code. Additionally, the temporary tattoo design may be identified in the image library 22 by comparing data points collected from the temporary tattoo 100 (e.g., physical temporary tattoo) with data points from a reference image (e.g., reference temporary tattoo design) stored in the reference library. That is, the ARTS 12 may identify a match between the temporary tattoo 100 and a reference image using the data points, and the reference image may be utilized to filter out distortion, such as may be created by application to contoured surfaces (e.g., surfaces of the body or objects), thereby facilitating improved detection of the QR codes 102. This or additional data obtained (e.g., via LIDAR) of contours, such as a shape of a component 104 (e.g., an arm), upon which the temporary tattoo 100 is disposed may be employed to generate AR graphics that properly correlate to the contours. For example, as illustrated by FIG. 3, a bird depicted by the temporary tattoo 100 may be made to appear as though it is flapping its wings via AR graphics and adjustments to the AR graphics may be made to maintain an illusion that the perceived ink forming the bird follows the contours and remains on the arm.

In some embodiments, a temporary tattoo design with one or more embedded QR codes 102 may be printed onto transfer paper (e.g., creating a temporary tattoo 100 on the transfer paper), which may be comprised of layers including paper, coatings, and films, and the guest may position the transfer paper having the temporary tattoo 100 onto a component 104 associated with the guest (e.g., an aspect of their body (e.g., back of hand, forearm, arm, bicep, ankle), an article of clothing, an accessory carried by the guest (e.g., purse, phone, bag)). In some embodiments, the printed tattoo 100 and/or the transfer paper may include instructions associated with the appropriate manner in which to apply the tattoo (e.g., acceptable location to apply tattoo, how to apply). For example, the instructions may instruct the guest to position the tattoo 100 printed on transfer paper on their forearm and apply a dissociating agent (e.g., water) to the transfer paper to transfer the tattoo 100 onto the guest's forearm.

In other embodiments, the temporary tattoo 100 may be printed or painted directly onto an aspect 104 of the guest (e.g., body part, article of clothing) such that no additional tattoo application process is required. That is, amusement park employees may be tasked with painting tattoos onto a guest, and the painted tattoo 100 may include one or more QR codes 102 and/or data points 106 embedded in the image. For example, amusement park employees may be trained to apply a tattoo with temporary ink (e.g., Henna tattoo) onto a guest using a template and portions of the tattoo 100 (e.g., a collection of dots) may correspond to one or more QR codes 102 embedded in the image. In other embodiments, projection mapping may be utilized to apply (e.g., print) a temporary tattoo 100 onto a body part, an article of clothing, or other object or accessory associated with the guest. The ARTS 12 may utilize projection mapping to determine a geometric profile of a potential application area (e.g., component 104, surface of component 104), thereby enabling a determination of an appropriate or acceptable area on which to print the temporary tattoo design and/or temporary tattoo for later reading by a scanner. For example, upon analyzing the geometric profile of a potential application area, if a degree of contour and/or variation in the geometric profile of the potential application area exceeds a specified threshold (e.g., greater than 10% contoured), the ARTS 12 may determine that the potential application area is an unsuitable location for applying the tattoo 100 (e.g., applying the tattoo in this area would result in inaccurate scanning of QR codes due to the geometric profile of the area) or adjust application to facilitate proper scanning.

In some embodiments, a number of cameras (e.g., electronic devices 14) positioned at various angles may be utilized to capture multiple images of a guest and/or object associated with a guest, and using the multiple images, the ARTS 12 may determine a number of acceptable locations upon which the temporary tattoo 100 can be effectively placed (e.g., printed or deposited). Similarly, once applied, multiple angles may be determined to later confirm the embedded code 102 (QR code) of the temporary tattoo 100. As disclosed herein, an "acceptable location" of the temporary tattoo 100 refers to a location on a guest or on an object associated with the guest onto which the temporary tattoo 100 may be applied that enables an accurate image of the temporary tattoo 100 to be captured or scanned (e.g., area having less than a threshold degree of contouring or variation). By determining a number of acceptable locations, the ARTS 12 may provide guests with different options such that guest preferences may be taken into account. For example, the projection mapping may determine that a guest's ankle and a guest's forearm both correspond to acceptable locations, and the guest may prefer to apply the tattoo to the guest's forearm. Regardless of the manner in which the tattoo 100 is generated and applied, the tattoo 100 may include one or more QR codes 102 embedded into the tattoo 100 and rendered in a manner such that the QR codes 102 may be extracted from the image and processed to provide additional features and services to guests within the amusement park.

Additionally, upon entering the amusement park or interactive area, or upon accessing a mobile application associated with the amusement park or interactive area, a guest profile may be generated for each guest within the amusement park or interactive area. Each guest profile may include personal information (e.g., height, weight, sex) associated with a guest, and the profiles may be personalized by the guest to provide indications as to which aspects of the amusement park may be of interest to the guest. For example, a guest profile may be personalized to indicate that the guest has an increased interest in a particular character that may be patrolling the amusement park or a particular type of ride. In other embodiments, the guest profile may be updated based on various activities performed by guests within the amusement park. For example, the guest may advance to a new level in an interactive game within the amusement park, and the guest profile may be automatically updated to reflect the guest's progress through the interactive game. In some embodiments, the QR codes 102 embedded into the temporary tattoos 100 may be associated with a guest profile such that as the guest profile is updated, the tattoos 100 may be subsequently scanned to provide new content to the guest, as described in greater detail below.

Further, as noted above, the temporary tattoo designs may be stored in an image library 22 (e.g., reference library). That is, the image library 22 may store reference images of each of the temporary tattoo designs available for application, and each of the reference images may include reference data points. The applied temporary tattoos 100 may also include data points 106 within the tattoo 100 that may be compared to the reference data points of the reference images, thereby enabling identification of a reference image associated with the temporary tattoo. Thereafter, the reference image may be utilized to filter out distortion, such as may be created by application to contoured surfaces (e.g., surfaces of the body), thereby facilitating improved detection of QR codes 102 and/or replacing the need of QR codes 102.

Additionally, in some embodiments, an image of the temporary tattoo 100 may be acquired after application to an aspect of the guest (e.g., body part, object associated with the guest), and the image of the temporary tattoo 100 may be associated with a guest's profile. That is, a reference image of the temporary tattoo may be captured after application and stored in the guest profile. In this way, specific attributes associated with each guest (e.g., measurements, degree of contour and/or variation in the geometric profile of the application area, and/or variation in the application location appearance (e.g., tone, beauty marks, and the like)) may be used to identify the tattoo design, an associated guest profile, and an applicable AR application with or without the use of the embedded QR codes 102. Further, certain geometries associated with placement of the temporary tattoo 100 (e.g., a contour of a guest's arm upon which the tattoo has been disposed) may be identified by comparing the image of the temporary tattoo 100 acquired after being deposited on the guest with a stock image of the temporary tattoo design associated with the temporary tattoo 100. Differences in the two images may be used to ascertain geometric aspects of the surface upon which the temporary tattoo 100 is positioned. By identifying such geometric aspects, present embodiments (e.g., including a QR code reader) may be provided with data to facilitate undistorting a subsequent image of the temporary tattoo 100 for use in reading the QR code 102. Specifically, for example, a model of the surface (e.g., a model of a hand) upon which the temporary tattoo is disposed may be used to virtually flatten an acquired image of the temporary tattoo 100 and then read imbedded data (e.g., a QR code).

As previously noted, the temporary tattoo 100 may be applied to a guest. As also discussed above, such application may include applying a printed version of the temporary tattoo 100. Instructions from the ARTS 12 to a printer may initiate said printing of the temporary tattoo 100, including direct printing onto the guest. After the temporary tattoo 100 is applied, guests may capture an image of the tattoo 100 with the computing device 32. As noted above, the computing device 32 may correspond to user computing devices (e.g., smart phones) and/or cameras, scanning devices, and other devices disposed throughout the amusement park and capable of capturing a digital image of the temporary tattoo 100 such that the QR codes 102 embedded within tattoo 100 may be extracted and processed by the ARTS 12. The computing devices 32 disclosed herein may be associated with applications and/or linked with amusement park components (e.g., VR/AR headset, VR/AR glasses, display) that may provide additional features associated with the tattoo based on capturing an image of the tattoo 100. For example, a user may download an augmented reality application onto a user computing device (e.g., smart phone, tablet) that provides access to content associated with the user's temporary tattoo 100 and/or temporary tattoo design. Upon capturing an image of the temporary tattoo 100, the ARTS 12 may cause (e.g., instruct) the augmented reality application to display an animated version of the guest's tattoo on a screen or a display (e.g., a processor (e.g., a processor of ARTS 12) may instruct the augmented reality application to output an image (e.g., instruct a display (e.g., screen of the user computing device 32)) to show (e.g., display) an animated version of the guest's tattoo, a processor (e.g., a processor of ARTS 12) may instruct a display (e.g., screen of the user computing device 32)) to show (e.g., display) the output of the augmented reality application (e.g., an animated version of the guest's tattoo)). The ARTS 12 may instruct an augmented reality application to augment the image of the temporary tattoo into an animated version of the temporary tattoo based on data (e.g., instructions) associated with machine-readable imagery (e.g., one or more QR codes or barcodes integrated with or associate with the tattoo). Thus, the augmented reality application may augment the temporary tattoo into an animated version thereof based on such instructions from the ARTS 12. However, in an embodiment, the ARTS 12 (e.g., a processor of the ARTS 12) may perform this task without using the augmented reality application. In some embodiments, the augmented reality application associated with the user computing device 32 may be an independent application that may be selected by the user to provide content associated with the tattoo 100 and/or temporary tattoo design. In other embodiments, the augmented reality application may operate in the background of the user computing device 32 and/or on the ARTS 12 such that, as a user captures an image with a camera application (e.g., using a sensor (e.g., camera, camera of the user computing device 32, camera communicatively coupled with the user computing device 32) in conjunction with the camera application, importing an image into the camera application), the ARTS 12 may cause (e.g., instruct) the camera application to call on the capabilities of the augmented reality application to display augmented content associated with the tattoo through the camera application (e.g., a processor (e.g., a processor of ARTS 12) may instruct the augmented reality application to instruct a display (e.g., screen of the user computing device 32, display communicatively coupled with the user computing device 32)) to show (e.g., display) an altered and/or animated version of the guest's tattoo while using the camera application (e.g., while the camera application and/or a user interface of the camera application is active on the user computing device 32, while the camera application and/or a user interface of the camera application is displayed on the display, a processor (e.g., a processor of ARTS 12) may instruct the augmented reality application to instruct the camera application to instruct a display (e.g., screen of the user computing device 32, screen communicatively coupled with the user computing device 32) to show (e.g., display) the output of the augmented reality application (e.g., an altered and/or animated version of the guest's tattoo), a processor (e.g., a processor of ARTS 12) may instruct the camera application to instruct a display (e.g., screen of the user computing device 32, screen communicatively coupled with the user computing device 32) to display an output of the augmented reality application (e.g., an altered and/or animated version of the guest's tattoo)). Further, based on other operations or detected data, the ARTS 12 may cause (e.g., instruct) the application to prompt a user to view the tattoo 100 via the associated camera to, for example, observe a change. For example, location detection data (e.g., GPS data) may indicate a user's location is within a threshold distance of a ride, experience, game element, or character of interest (each may be identified based on user preferences, entitlements, and/or game/experience progress) and this may cause the ARTS 12 to prompt the user to view the tattoo 100 via their associated device 32 (e.g., view using a smart phone (e.g., view on the display of the smart phone) wherein the image of the tattoo 100 may be captured using a sensor (e.g., camera (e.g., camera of the smart phone, camera communicatively coupled with the smart phone)) to capture the image of the tattoo 100).

Figure 4:
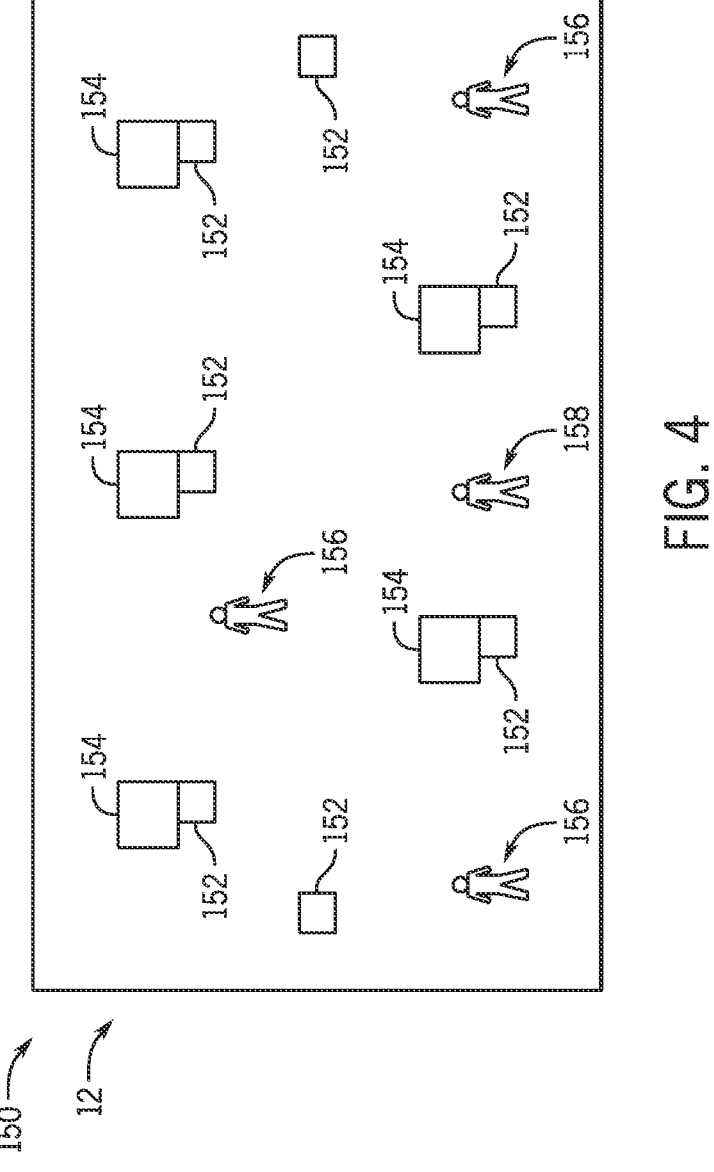
FIG. 4 illustrates a schematic view of an embodiment of an amusement park utilizing the augmented reality tattoo system of FIG. 1, in accordance with embodiments described herein.

As noted above, in some embodiments, the computing devices 32 used to capture images of the temporary tattoos 100 may be disposed throughout the park and/or associated with an amusement park attraction. For example, FIG. 4 illustrates an amusement park 150 having one or more scanning stations 152 associated with respective amusement park attractions 154 that enable a guest to capture an image of a tattoo to access additional content. The scanning stations 152 may include VR/AR headsets, VR/AR glasses, or scanners (e.g., cameras) and displays (e.g., LED panels). Additionally, the scanning stations 152 may include communication circuitry that enables the scanning stations 152 to transmit and receive data to and from the ARTS 12, thereby enabling the ARTS 12 to extract the QR codes 102 embedded within the temporary tattoo 100 and instruct the scanning station 152 to display additional content associated with the temporary tattoo 100. In some embodiments, the scanning stations 152 may be disposed throughout the park 150 and may not necessarily be associated with a particular amusement park attraction 154. That is, the scanning stations 152 may be disposed throughout the amusement park 150 and may operate independently of other amusement park attractions 154 to provide an experience for guests within the amusement park 150. In certain embodiments, each of the scanning stations 152 may include the ARTS 12 and/or may include a processor of the ARTS 12, thereby enabling the scanning stations to perform the embodiments described herein. Further, it should be noted that capturing an image of the tattoo 100 may refer to the process of hovering over or otherwise observing the tattoo 100 to obtain image data such that the computing device 32 may extract the one or more QR codes 102 or identifying data from the tattoo 100, thereby enabling the ARTS 12 to provide additional content. That is, embodiments of the present disclosure are directed to providing a dynamic (e.g., live) view of a guest's tattoo 100 that may be augmented, animated, or distorted to provide additional features and content when processed and viewed by the computing devices disclosed above. As noted above, the multiple QR codes 102 embedded into a single tattoo 100 may increase the probability that a complete QR code is extracted. That is, the temporary tattoo 100 may be applied such that capturing a partial image of the temporary tattoo 100 may still access the entirety of the data associated with the tattoo 100. For example, the systems in accordance with present embodiments may print the temporary tattoo design and/or temporary tattoo 100 such that certain portions of the embedded QR codes 102 overlap and/or are repeated. Thus, in a case where a portion of a guest's tattoo 100 is not captured or is wearing off, the computing devices 32 may still be able to extract a complete QR code 102 by extracting segments of the QR code 102 from different areas within the tattoo 100 until a complete QR code is obtained. Further still, as noted above, data points 106 within the temporary tattoo 100 may be used to identify a reference image (e.g., clean image, temporary tattoo design) in the image library 22, such that the reference image may be used in lieu of or in supplement to the QR codes 102 embedded within the temporary tattoo 100 to access the functionalities of the AR applications disclosed herein.

As noted above, during or after capturing an image of the temporary tattoo 100, the QR codes 102 and/or the data points 106 embedded within the tattoo 100 may be extracted by the ARTS 12 to provide additional content for a guest within the amusement park. In some embodiments, while capturing or after capturing the image of the tattoo 100, the ARTS 12 may access an augmented reality application to provide visual and/or audio and/or haptic feedback of an animated version of the tattoo on the computing device (e.g., feedback through a display screen, VR/AR glasses, VR/AR headset, speaker (e.g., speaker of the computing device or speaker communicatively connected to the computing device), vibration of the computing device and/or components thereof). For example, in some instances, the temporary tattoo 100 may be a bird and upon capturing or scanning the image (e.g., temporary tattoo and/or temporary tattoo design) of the bird, the ARTS 12 may cause (e.g., instruct) the augmented reality application to alter the appearance (e.g., statically, dynamically), animate, and/or output sound related to the bird (e.g., show the bird flapping wings, making a bird call). That is, a processor (e.g., of the ARTS 12) may instruct the augmented reality application to instruct a display and/or a speaker (e.g., screen of the user computing device 32, speaker of the user computing device 32) to output (e.g., display and/or provide audio feedback) the bird flapping wings and/or making a bird call, and/or a processor (e.g., a processor of ARTS 12) may instruct a display and/or a speaker (e.g., screen of the user computing device 32, speaker of the user computing device 32) to output (e.g., display and/or provide audio feedback) the output of the augmented reality application (e.g., bird flapping wings or making a bird call).

In some embodiments, the image to be tattooed (e.g., temporary tattoo design) and/or associated with the guest may be chosen by the guest from a list of stock images prior to printing the tattoo. The list of stock images (e.g., temporary tattoo designs) may include information associated with each of the stock images including information related to the manner in which the tattoo is animated upon processing the tattoo with augmented reality equipment (e.g., manner in which the tattoo is augmented). For example, information associated with the bird may indicate that upon scanning the tattoo of the bird, an AR application may be opened by the ARTS 12 to provide visual feedback of the bird with flapping wings and/or audio feedback of the bird singing a tune. Similarly, information associated with a dragon may indicate that upon scanning the tattoo of the dragon, the AR application may be opened to provide visual feedback of the dragon blowing fire, while information associated with a lion may indicate that upon scanning the tattoo of the lion, the AR application may provide visual or audio feedback of the lion roaring. Further, information associated with the individual purchasing and/or wearing the tattoo may be incorporated into effects generated based on reading the QR code 102 integrated with the tattoo 100. For example, if a user's data indicates a favorite color (e.g., green), the provided animation (e.g., depiction of a dragon breathing fire) in AR, VR or the like may incorporate the favorite color (e.g., green fire).

In some embodiments, effects associated with the temporary tattoos chosen by the guests may automatically evolve (e.g., update, change) based on completed activities within the park or based on an amount of time spent in the park. For example, as noted above, a guest profile may be utilized to monitor a guest's activities within the amusement park 150. The guest profile may also be linked to a user computing device 32 such that upon reaching a certain level in a game or accomplishing a specified goal (e.g., spending a threshold amount of time in the park), the ARTS 12 may update the guest profile to reflect the accomplishment. Upon updating the guest profile, the ARTS 12 may send a notification to a computing device 32 associated with the guest indicating new content associated with the guest's temporary tattoo 100 is available. The notification may include a recommendation to capture an image of the temporary tattoo 100 such that the guest may enjoy the new content. For example, a guest may initially elect to have a tattoo of a flower and upon capturing or scanning an image of the flower (e.g., temporary tattoo of the flower and/or temporary tattoo design of the flower) for the first time, the ARTS 12 may instruct display of the temporary tattoo as a seedling of a flower (e.g., a processor (e.g., a processor of ARTS 12) may instruct the augmented reality application to instruct a display (e.g., screen of the user computing device 32) to show (e.g., display) an animated version of the guest's tattoo (e.g., animated version of guest's tattoo as a seedling), a processor (e.g., a processor of ARTS 12) may instruct a display (e.g., screen of the user computing device 32)) to show (e.g., display) the output of the augmented reality application (e.g., animated version of guest's tattoo (e.g., animated seedling of a flower))). The guest may then perform certain activities within the park (e.g., advance to certain levels in a video game, experience a particular attraction, spend a threshold amount of time in the park). After performing the activities, the ARTS 12 may prompt the guest to capture a subsequent image of the temporary tattoo 100 and the ARTS 12 may instruct display of the subsequent image as a blossoming flower (e.g., a processor (e.g., a processor of ARTS 12) may instruct the augmented reality application to instruct a display (e.g., screen of the user computing device 32) to show (e.g., display) an animated version of the guests's tattoo (e.g., the seedling blossoming into a flower), a processor (e.g., a processor of ARTS 12) may instruct a display (e.g., screen of the user computing device 32)) to show (e.g., display) the output of the augmented reality application (e.g., animated version of the guest's tattoo (e.g., the seedling blossoming into a flower))). Thus, as the guest progresses through the amusement park 150 and performs additional activities, the image of the tattoo 100 may also progress based on the guest's completed activities.

In some embodiments, guests may become eligible for upgrades to their tattoo based on completed activities. That is, a guest may receive an indication that the guest has earned a badge or award or unlocked certain content based on activities performed by the guest. The guest may open the augmented reality application (e.g., access the user interface of the augmented reality application) to retrieve the upgrade such that upon subsequently capturing an image of the tattoo 100, new content is displayed. For example, a guest may initially elect to have a tattoo of a lion and upon capturing an image of the lion for the first time, the ARTS 12 may instruct display of an animated version of the lion with no additional features (e.g., a processor (e.g., a processor of ARTS 12) may instruct the augmented reality application to instruct a display (e.g., screen of the user computing device 32) to show (e.g., display) the lion walking through a field, a processor (e.g., a processor of ARTS 12) may instruct a display (e.g., screen of the user computing device 32)) to show (e.g., display) the output of the augmented reality application (e.g., lion walking through the field)). Upon performing various activities within the park 150 and unlocking certain content based on the activities, the guest may retrieve the upgrade associated with the performed activities and the ARTS 12 may instruct display of a subsequent image of the animated lion with a crown (e.g., a processor (e.g., a processor of ARTS 12) may instruct the augmented reality application to instruct a display (e.g., screen of the user computing device 32) to show (e.g., display) the lion walking through the field with a crown, a processor (e.g., a processor of ARTS 12) may instruct a display (e.g., screen of the user computing device 32)) to show (e.g., display) the output of the augmented reality application (e.g., lion walking through the field with a crown)). In some embodiments, guests may elect to purchase various upgrades to image of their tattoo 100 in lieu of performing activities within the amusement park 150. For example, a guest may open the augmented reality application (e.g., access the user interface of the augmented reality application) and may purchase accessories (e.g., clothes, skins, hats, glasses), banners, and additional content that may be displayed upon capturing a subsequent image of the tattoo 100. Further, upon completion of certain tasks, guests may be given the option to upgrade the physical version of the tattoo 100 (e.g., obtain a tattoo with limited availability) including extensions to the original tattoo design or complimentary tattoos added to the guest.

It should be noted that in some embodiments, the ARTS 12 may update the guest profile to store historical data associated with guests' completed activities during previous visits to the amusement park. The guest profile may also store data associated with a guest's tattoo such that guests returning to the park may retrieve such data and resume evolving or upgrading their temporary tattoo 100 from the point of their last visit. That is, upon returning to the amusement park 150 on a subsequent visit, a guest may elect to have the same temporary tattoo design that was previously applied during a previous visit to the amusement park. The QR codes 102 embedded in the temporary tattoo 100 may be used to associate the temporary tattoo 100 with the guest's profile such that upon capturing an image of the temporary tattoo 100, the ARTS 12 may instruct display of the temporary tattoo 100 with the various upgrades earned in previous visits to the amusement park 150 (e.g., a processor (e.g., a processor of ARTS 12) may instruct the augmented reality application to instruct a display (e.g., screen of the user computing device 32) to show (e.g., display) an animated version of the guest's tattoo having the various upgrades, a processor (e.g., a processor of ARTS 12) may instruct a display (e.g., screen of the user computing device 32)) to show (e.g., display) the output of the augmented reality application (e.g., an animated version of the guest's tattoo with the upgrades earned during a previous visit to the amusement park)). Using the example of the temporary tattoo of the flower above, on a first trip to the park 150, the guest's animated tattoo may progress from a seedling to a blossoming flower based on various activities performed by the guest within the park. Upon returning to the park 150 for a second trip, the guest may elect the same temporary tattoo design associated with the flower. However, during the second trip, scanning an image of the temporary tattoo 100 may cause the ARTS 12 to instruct display of the animated tattoo as a blossoming flower as opposed to the seedling displayed during the first trip, such that a guest may evolve or upgrade the blossoming flower into a garden with multiple flowers. Similarly, the guest profile may maintain records of purchases and/or upgrades earned such that guests may continue building their virtually animated tattoo.

In some embodiments, the ARTS 12 may also monitor and track guests' movement throughout the amusement park 150 such that a location of a guest may be determined. The ARTS 12 may retrieve such location data based on data received from global positioning satellites which may be indicative of a location of a guest within the park based on signals from a user computing device 32 associated with the guest. The ARTS 12 or other computing device may use the data indicative of a location of the guest to determine a location of a guest (e.g., location of the guest within the park). The ARTS 12 may also monitor other individuals employed as characters 156 for the amusement park 150. For example, the amusement park 150 may be a theme park and may employ a number of individuals dressed up as characters 156 associated with the theme of the amusement park 150. Further, as noted above, the guest profile may be utilized to store information related to a guest's preferences (e.g., characters of interest to the guest, groups the guest belongs to, particular rides of interest to the guest). In some embodiments, the ARTS 12 may retrieve the guest profile to identify a number of associations, preferences, or interests of a guest based on completed activities. For example, the guest may take a quiz and the quiz may indicate that the guest should be associated with a particular group. The guest profile may be updated to reflect the particular group with which the guest is and/or should be associated, thereby enabling the ARTS 12 to determine additional associations that may be of interest to the guest based on the results of the quiz.

Using a guest's location within a park and the preferences, interests, and associations stored in the guest profile, the ARTS 12 may determine that a guest 158 is within a threshold proximity (e.g., 15 meters, 30 meters, 100 meters) of a particular character 156 or attraction 154 that may be associated with an increased interest to the guest 158 (as indicated by the guest's profile). Upon determining that the guest 158 is within the threshold proximity, the guest 158 may be prompted to capture an image of the tattoo 100, and the animated tattoo may display content related to the aspect of the amusement park 150 that may interest the guest. For example, upon determining that a character 156 or attraction 154 of interest is within a threshold proximity, the ARTS 12 may prompt the guest 158 to capture an image of their tattoo 100 and the display (e.g., display associated with a scanning station 152, display associated with the computing device 32) may show an animated version of the tattoo directing the guest to the character 156 or attraction 154 of interest (e.g., animated version of a lion holding an arrow pointing in a specified direction) or an animated version of the tattoo incorporating a map with location data (e.g., the lion holding a map with an indication of a desired destination and an indication of a current location of the guest). In certain embodiments, the guest profile may also store information associated with attractions of interest (e.g., experiences, interactive games, interactive elements) to the guest or attractions that the guest has not yet experienced. Thus, upon determining that a guest is within a threshold distance of an attraction that is closing or an attraction that the guest has not yet experienced, the ARTS 12 may cause the tattoo 100 to be animated to display a warning message or an indication to travel to the attraction before closing. In some embodiments, the ARTS 12 may only notify guests of the proximity of certain attractions 154 (e.g., interactive games, interactive elements, experiences) based on the user profile. In this way, network traffic associated with a guest's computing device 32 may be limited to instances that are associated with an increased interest to the guest, thereby enabling the guest to enjoy other aspects of the amusement park and improving associated computer operation.

Additionally, as noted above, in certain embodiments, the electronic devices 14 may be configured to capture data associated with a guest's motions or gestures within the amusement park. For example, the electronic device 14 may include cameras, sensors, and/or other technology for tracking and/or recognizing guest's motions or gestures (e.g., hand, head, eye tracking). Thus, as a guest moves or makes gestures while participating in an attraction, data relating to the recognized gesture may be provided to the ARTS 12, thereby enabling the ARTS 12 to generate a responsive animation of the temporary tattoo. For example, the guest may elect a temporary tattoo design of a ball or projectile and the temporary tattoo design may be placed on the guest's hand. Further, the electronic devices 14 disposed about the amusement park may capture image and/or video data of a guest making a throwing motion with the hand having the temporary tattoo design of the ball thereon. In turn, the ARTS 12 may generate an augmented reality version of the temporary tattoo being thrown. For example, upon scanning an image of the temporary tattoo after making the throwing motion, the ARTS 12 may instruct display of an animated version of the ball being thrown in a virtual space that corresponds to the physical space associated with the guest's location (e.g., a processor (e.g., a processor of ARTS 12) may instruct the augmented reality application to instruct a display (e.g., screen of the user computing device 32) to show (e.g., display) a ball or projectile being thrown in a virtual space, a processor (e.g., a processor of ARTS 12) may instruct a display (e.g., screen of the user computing device 32)) to show (e.g., display) the output of the augmented reality application (e.g., ball thrown in the virtual space)). Further, the ARTS 12 may receive data about other physical and/or virtual objects presented or displayed in the physical environment, including props, characters, or media images. Based on the guest's captured motion, the ARTS 12 may use the captured data to identify a virtual trajectory of the animated tattoo, and/or to identify objects that may be virtually struck by the animated tattoo as the animated tattoo travels through the virtual space. The ARTS 12 may then record or upload the action or achievement (e.g., how far the object was thrown, which objects within the virtual space were struck) to the guest's user profile, and later display a score or captured reward when the guest uses a computing device or scanning station to capture an image of the temporary tattoo. The temporary tattoo thereby enables guests to interact with the perceived environment without the use of physical objects (such as balls or projectiles) in the physical environment where other guests are also interactively participating.

In some embodiments, the temporary tattoo 100 may take the form of a text block or key board that may be used as part of a text deciphering experience within the amusement park. For example, a temporary tattoo 100 of a text block that does not contain any legible words may be applied to a guest or an object associated with the guest. As the guest completes certain activities within the amusement park 150 (e.g., advances in an interactive game (e.g., video game), spends a threshold amount of time in the park, finds a certain clue), the ARTS 12 may prompt the guest to capture an image of the tattoo 100 and the computing device 32 (or the scanning station 152) may display the letters being rearranged to reveal a legible word or sentence. In some embodiments, the guest may present the revealed word or sentence to amusement park personnel to retrieve a prize or award. In other embodiments, the revealed word or sentence may present an additional activity or challenge for the guest to complete. That is, the revealed word or sentence may provide an indication to go to a different area of the park to retrieve an additional clue. In some embodiments, upon determining that the guest has reached the different area in the park, the ARTS 12 may cause the animated version of the tattoo 100 (e.g., version of tattoo when captured via user computing device having augmented reality capabilities) to be scrambled again. Accordingly, subsequent capture of the tattoo 100 may reveal that the tattoo 100 is once again illegible, and thus additional activities must be completed to decipher the newly rearranged text block (e.g., to reveal the next clue). The scrambling and unscrambling of letters may be replaced by other methods, such as a tattoo in the form of an enclosure, such as a box, that the ARTS 12 virtually displays as open to reveal contents upon performance of tasks. This may be part of or include a scavenger hunt activity. In any scavenger/game experience, the QR code 102 could include an identifier linked to a game account that would then present captured/collected scavenger hunt items or points earned.

It should be noted that at any time, a user may elect to have the temporary tattoo modified or apply a different tattoo that may be augmented by the computing devices and components discussed above. Further, in some embodiments, the amusement park may prompt the guest to receive a modification or new tattoo because the guest has reached a maximum upgrade level and/or the guest has completed all of the activities associated with a particular tattoo. For example, upon deciphering a set of clues associated with a particular text block tattoo, the amusement park may send a notification to the guest to apply a new tattoo to receive additional clues associated with a different scavenger hunt or a scavenger hunt with an increased level of difficulty. As another example, a guest may purchase a sleeve or garment having a temporary tattoo design thereon or designed to receive the temporary tattoo designs thereon. Upon completing certain activities, the guest may receive an indication that the guest is eligible for one or more upgrades to the garment, such as additional tattoo designs or a garment with an increased amount of design, color, and the like.

Employing tattoos that incorporate QR codes to access various entertaining functionalities may be particularly beneficial because guests do not wish to carry additional items while traveling within a theme park. These temporary tattoos and/or temporary tattoo designs could be deployed with printers or created online and sent to consumers as a tattoo design (or possibly printed directly by consumers). As discussed above, the embedded QR codes of the temporary tattoos may include various different types of scannable data that might initiate different operations (e.g., opening a map, a photo album, location-based information). The tattoo QR code could include or reference an embedded digital wallet address for receiving NFTs or other digital content (e.g., pictures at a concert or park), so that a user does not have to carry anything physical with them but can collect digital content. For example, a photo location could include a scanner that automatically takes and sends a picture to a user's electronic wallet based on reading a QR code from a tattoo. Similarly, individuals could scan each other's QR codes from their respective tattoos to send data (e.g., pictures).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
one or more processors; and
memory storing instructions that, when executed by the one or more processors, are configured to cause the one or more processors to:
receive an image of a temporary tattoo incorporating machine-readable imagery;
read the machine-readable imagery from the image of the temporary tattoo;
instruct an augmented reality application to augment the image of the temporary tattoo into an animated version of the temporary tattoo based on data associated with the machine-readable imagery;
instruct display of the animated version of the temporary tattoo;
retrieve user-profile data from a user profile associated with a guest having the temporary tattoo, wherein the user-profile data is indicative of one or more amusement park attractions of interest to the guest within an amusement park;

determine a first location of the guest within the amusement park and a second location of an amusement park attraction of the one or more amusement park attractions within the amusement park; and send a notification to a computing device associated with the guest in response to determining that the first location is within a threshold distance of the second location, wherein the notification includes a recommendation to travel in a direction toward the second location.

2. The system of claim 1, wherein the machine-readable imagery comprises one or more quick response (QR) codes with one or more data points configured to increase detectability of the one or more QR codes.

3. The system of claim 2, wherein the one or more processors are configured to:

compare the one or more data points with one or more reference data points associated with one or more reference images stored in an image library;

identify a match between the one or more data points and the one or more reference data points to identify a reference image of the one or more reference images, wherein the reference image includes the one or more QR codes; and instruct the augmented reality application to augment the image of the temporary tattoo based on additional instructions linked to the one or more QR codes.

4. The system of claim 1, wherein the instructions, when executed by the one or more processors, are configured to cause the one or more processors to:

instruct a printer to generate the temporary tattoo.

5. The system of claim 1, wherein the instructions, when executed by the one or more processors, are configured to cause the one or more processors to augment the image into the animated version using the augmented reality application based on the user-profile data associated with the machine-readable imagery.

6. The system of claim 1, wherein the user-profile data is indicative of one or more characters of interest to the guest associated with the user-profile.

7. The system of claim 6, wherein the instructions, when executed by the one or more processors, are configured to cause the one or more processors to:

determine a third location of a character of the one or more characters of interest associated with the guest; and send an additional notification to the computing device associated with the guest in response to determining that the first location is within an additional threshold distance of the third location, wherein the additional notification includes an additional recommendation to travel in a second direction toward the third location.

8. The system of claim 1, wherein the instructions, when executed by the one or more processors, are configured to cause the one or more processors to:

receive user activity data associated with the guest of the amusement park, wherein the user activity data is indicative of one or more actions performed by the guest within the amusement park; and send an additional notification to the computing device associated with the guest in response to the guest performing the one or more actions, wherein the notification includes an additional recommendation to capture an additional image of the temporary tattoo.

9. The system of claim 8, wherein the instructions, when executed by the one or more processors, are configured to cause the one or more processors to:

receive the additional image of the temporary tattoo;

read the machine-readable imagery from the additional image of the temporary tattoo;

instruct the augmented reality application to augment the additional image of the temporary tattoo into an upgraded animated version of the temporary tattoo based on reading of the machine-readable imagery; and instruct display of the upgraded animated version of the temporary tattoo, wherein the upgraded animated version includes one or more upgrades relative to the animated version of the temporary tattoo, wherein the one or more upgrades are based on the one or more actions performed by the guest within the amusement park.

10. The system of claim 1, wherein the machine-readable imagery comprises two or more quick response codes that are identical and disposed in different locations within the temporary tattoo.

11. The system of claim 1, wherein the notification includes an additional recommendation to capture an additional image of the temporary tattoo, and wherein the one or more processors are configured to:

receive the additional image of the temporary tattoo;

instruct the augmented reality application to augment the additional image of the temporary tattoo into an additional animated version of the temporary tattoo; and instruct display of the additional animated version of the temporary tattoo, wherein the additional animated version of the temporary tattoo includes an indication to travel in the direction toward the second location.

12. A method for providing an augmented reality temporary tattoo, the method comprising:

generating, via one or more processors, a temporary tattoo design having one or more quick response (QR) codes embedded within the temporary tattoo design;

applying the temporary tattoo design to a guest within an amusement park as a temporary tattoo, wherein the temporary tattoo includes the one or more QR codes;

extracting, using the one or more processors, the one or more QR codes from an image of the temporary tattoo captured via an image sensor of a computing device;

instructing, via the one or more processors, an augmented reality application to augment the image of the temporary tattoo into an animated version of the temporary tattoo based on the extracting of the one or more QR codes from the image of the temporary tattoo;

displaying, via a display associated with the computing device, the animated version of the temporary tattoo;

receiving, via the one or more processors, user activity data associated with the guest, wherein the user activity data is indicative of one or more actions performed by the guest within the amusement park;

receiving, via the one or more processors, an additional image of the temporary tattoo after the guest has performed the one or more actions; and instructing, via the one or more processors, the augmented reality application to augment the additional image of the temporary tattoo into an upgraded animated version of the temporary tattoo having one or more upgrades relative to the animated version of the temporary tattoo, wherein the one or more upgrades are based on the one or more actions performed by the guest within the amusement park.

13. The method of claim 12, comprising augmenting the image of the temporary tattoo into the animated version using the augmented reality application based on user-profile data associated with the one or more QR codes.

14. The method of claim 12, comprising:

sending a notification to the computing device associated with the guest in response to the guest performing the one or more actions, wherein the one or more actions are indicative of the guest advancing in a video game associated with the amusement park, and wherein the notification includes a recommendation to capture the additional image of the temporary tattoo.

15. The method of claim 12, comprising:

extracting the one or more QR codes from the additional image of the temporary tattoo; and displaying the upgraded animated version of the temporary tattoo.

16. A non-transitory, computer-readable medium comprising computer-executable instructions that, when executed by one or more processors, cause the one or more processors to:

receive an image of a temporary tattoo incorporating machine-readable imagery;

read the machine-readable imagery from the image of the temporary tattoo;

instruct an augmented reality application to augment the image of the temporary tattoo into an animated version of the temporary tattoo based on data associated with the machine-readable imagery;

instruct display of the animated version of the temporary tattoo;

retrieve user-profile data from a user profile associated with a guest having the temporary tattoo, wherein the user-profile data is indicative of one or more characters of interest to the guest within an amusement park;

determine a first location of the guest within the amusement park and a second location of a character of interest of the one or more characters of interest within the amusement park; and send a notification to a computing device associated with the guest in response to determining that the first location is within a threshold distance of the second location, wherein the notification includes a recommendation to travel in a direction toward the second location.

17. The non-transitory, computer-readable medium of claim 16, wherein the instructions, when executed by the one or more processors, cause the one or more processors to:

receive user activity data associated with the guest of the amusement park, wherein the user activity data is indicative of one or more actions performed by the guest within the amusement park; and send an additional notification to the computing device associated with the guest in response to the guest performing the one or more actions, wherein the one or more actions are indicative of the guest spending greater than a threshold amount of time in the amusement park, and wherein the notification includes an additional recommendation to capture an additional image of the temporary tattoo.

18. The non-transitory, computer-readable medium of claim 17, wherein the instructions, when executed by the one or more processors, cause the one or more processors to:

receive the additional image of the temporary tattoo;

read the machine-readable imagery from the additional image of the temporary tattoo;

instruct the augmented reality application to augment the additional image of the temporary tattoo into an upgraded animated version of the temporary tattoo based on reading of the machine-readable imagery; and instruct display of the upgraded animated version of the temporary tattoo, wherein the upgraded animated version of the temporary tattoo includes one or more upgrades relative to the animated version of the temporary tattoo, wherein the one or more upgrades are based on the one or more actions performed by the guest within the amusement park.

19. The non-transitory, computer-readable medium of claim 16, wherein the instructions, when executed by the one or more processors, cause the one or more processors to augment the image into the animated version using the augmented reality application based on the user-profile data associated with the machine-readable imagery.

20. The non-transitory, computer-readable medium of claim 16, wherein the notification includes an additional recommendation to capture an additional image of the temporary tattoo, and wherein the instructions cause the one or more processors to:

receive the additional image of the temporary tattoo;

instruct the augmented reality application to augment the additional image of the temporary tattoo into an additional animated version of the temporary tattoo; and instruct display of the additional animated version of the temporary tattoo, wherein the additional animated version of the temporary tattoo includes an indication to travel in the direction toward the second location.

* * * * *